(12) United States Patent
Sebes et al.

(10) Patent No.: US 8,763,118 B2
(45) Date of Patent: *Jun. 24, 2014

(54) CLASSIFICATION OF SOFTWARE ON NETWORKED SYSTEMS

(71) Applicant: McAfee, Inc., Santa Clara, CA (US)

(72) Inventors: E. John Sebes, Menlo Park, CA (US); Rishi Bhargava, San Jose, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/629,765

(22) Filed: Sep. 28, 2012

(65) Prior Publication Data

US 2013/0024934 A1 Jan. 24, 2013

Related U.S. Application Data

(60) Continuation of application No. 12/944,567, filed on Nov. 11, 2010, now Pat. No. 8,307,437, which is a division of application No. 11/182,320, filed on Jul. 14, 2005, now Pat. No. 7,856,661.

(51) Int. Cl.
*G06F 11/00* (2006.01)

(52) U.S. Cl.
USPC ............... 726/22; 726/23; 726/24; 713/176; 713/188; 714/4.21; 714/26; 706/47

(58) Field of Classification Search
USPC ........ 726/22–24; 713/176, 188; 714/4.21, 26; 706/47
See application file for complete search history.

(56) References Cited

U.S. PATENT DOCUMENTS

| 4,688,169 A | 8/1987 | Joshi |
| 4,982,430 A | 1/1991 | Frezza et al. |
| 5,155,847 A | 10/1992 | Kirouac et al. |

(Continued)

FOREIGN PATENT DOCUMENTS

| CN | 1383295 A | 12/2002 |
| CN | 103283202 A | 9/2013 |

(Continued)

OTHER PUBLICATIONS

"What's New: McAfee VirusScan Enterprise, 8.8," copyright 2010, retrieved on Nov. 23, 2012 at https://kc.mcafee.com/resources/sites/MCAFEE/content/live/PRODUCT_DOCUMENTATION/22000/PD22973/en_US/VSE%208.8%20-%20What's%20New.pdf, 4 pages.

(Continued)

*Primary Examiner* — Thanhnga B Truong
(74) *Attorney, Agent, or Firm* — Patent Capital Group

(57) ABSTRACT

A method and system for the classification of software in networked systems, includes: determining a software received by a sensor is attempting to execute on a computer system of the sensor; classifying the software as authorized or unauthorized to execute, and gathering information on the software by the sensor if the software is classified as unauthorized to execute. The sensor sends the information on the software to one or more actuators, which determine whether or not to act on one or more targets based on the information. If so, then the actuator sends a directive to the target(s). The target(s) updates its responses according to the directive. The classification of the software is definitive and is not based on heuristics or rules or policies and without any need to rely on any a priori information about the software.

14 Claims, 3 Drawing Sheets

(56) References Cited

U.S. PATENT DOCUMENTS

| | | |
|---|---|---|
| 5,222,134 A | 6/1993 | Waite et al. |
| 5,390,314 A | 2/1995 | Swanson |
| 5,521,849 A | 5/1996 | Adelson et al. |
| 5,560,008 A | 9/1996 | Johnson et al. |
| 5,699,513 A | 12/1997 | Feigen et al. |
| 5,778,226 A | 7/1998 | Adams et al. |
| 5,778,349 A | 7/1998 | Okonogi |
| 5,787,427 A | 7/1998 | Benantar et al. |
| 5,842,017 A | 11/1998 | Hookway et al. |
| 5,907,709 A | 5/1999 | Cantey et al. |
| 5,907,860 A | 5/1999 | Garibay et al. |
| 5,926,832 A | 7/1999 | Wing et al. |
| 5,944,839 A * | 8/1999 | Isenberg ................... 714/26 |
| 5,974,149 A | 10/1999 | Leppek |
| 5,987,610 A | 11/1999 | Franczek et al. |
| 5,987,611 A | 11/1999 | Freund |
| 5,991,881 A | 11/1999 | Conklin et al. |
| 6,064,815 A | 5/2000 | Hohensee et al. |
| 6,073,142 A | 6/2000 | Geiger et al. |
| 6,141,698 A | 10/2000 | Krishnan et al. |
| 6,192,401 B1 | 2/2001 | Modiri et al. |
| 6,192,475 B1 | 2/2001 | Wallace |
| 6,256,773 B1 | 7/2001 | Bowman-Amuah |
| 6,275,938 B1 | 8/2001 | Bond et al. |
| 6,321,267 B1 | 11/2001 | Donaldson |
| 6,338,149 B1 | 1/2002 | Ciccone, Jr. et al. |
| 6,356,957 B2 | 3/2002 | Sanchez, II et al. |
| 6,393,465 B2 | 5/2002 | Leeds |
| 6,442,686 B1 | 8/2002 | McArdle et al. |
| 6,449,040 B1 | 9/2002 | Fujita |
| 6,453,468 B1 | 9/2002 | D'Souza |
| 6,460,050 B1 | 10/2002 | Pace et al. |
| 6,496,477 B1 * | 12/2002 | Perkins et al. ............ 370/228 |
| 6,587,877 B1 | 7/2003 | Douglis et al. |
| 6,611,925 B1 | 8/2003 | Spear |
| 6,658,645 B1 | 12/2003 | Akuta et al. |
| 6,662,219 B1 | 12/2003 | Nishanov et al. |
| 6,748,534 B1 | 6/2004 | Gryaznov et al. |
| 6,769,008 B1 | 7/2004 | Kumar et al. |
| 6,769,115 B1 | 7/2004 | Oldman |
| 6,795,966 B1 | 9/2004 | Lim et al. |
| 6,832,227 B2 | 12/2004 | Seki et al. |
| 6,834,301 B1 | 12/2004 | Hanchett |
| 6,847,993 B1 | 1/2005 | Novaes et al. |
| 6,907,600 B2 | 6/2005 | Neiger et al. |
| 6,918,110 B2 | 7/2005 | Hundt et al. |
| 6,930,985 B1 | 8/2005 | Rathi et al. |
| 6,934,755 B1 | 8/2005 | Saulpaugh et al. |
| 6,988,101 B2 | 1/2006 | Ham et al. |
| 6,988,124 B2 | 1/2006 | Douceur et al. |
| 7,007,302 B1 | 2/2006 | Jagger et al. |
| 7,010,796 B1 | 3/2006 | Strom et al. |
| 7,024,548 B1 | 4/2006 | O'Toole, Jr. |
| 7,039,949 B2 | 5/2006 | Cartmell et al. |
| 7,054,930 B1 | 5/2006 | Cheriton |
| 7,065,767 B2 | 6/2006 | Kambhammettu et al. |
| 7,069,330 B1 | 6/2006 | McArdle et al. |
| 7,082,456 B2 | 7/2006 | Mani-Meitav et al. |
| 7,093,239 B1 | 8/2006 | van der Made |
| 7,124,409 B2 | 10/2006 | Davis et al. |
| 7,139,916 B2 | 11/2006 | Billingsley et al. |
| 7,152,148 B2 | 12/2006 | Williams et al. |
| 7,159,036 B2 | 1/2007 | Hinchliffe et al. |
| 7,177,267 B2 | 2/2007 | Oliver et al. |
| 7,203,864 B2 | 4/2007 | Goin et al. |
| 7,251,655 B2 | 7/2007 | Kaler et al. |
| 7,290,266 B2 | 10/2007 | Gladstone et al. |
| 7,302,558 B2 | 11/2007 | Campbell et al. |
| 7,330,849 B2 | 2/2008 | Gerasoulis et al. |
| 7,340,684 B2 | 3/2008 | Ramamoorthy et al. |
| 7,346,781 B2 | 3/2008 | Cowie et al. |
| 7,349,931 B2 | 3/2008 | Horne |
| 7,350,204 B2 * | 3/2008 | Lambert et al. ............ 717/172 |
| 7,353,501 B2 | 4/2008 | Tang et al. |
| 7,363,022 B2 | 4/2008 | Whelan et al. |
| 7,370,360 B2 | 5/2008 | van der Made |
| 7,385,938 B1 | 6/2008 | Beckett et al. |
| 7,406,517 B2 | 7/2008 | Hunt et al. |
| 7,441,265 B2 | 10/2008 | Staamann et al. |
| 7,464,408 B1 | 12/2008 | Shah et al. |
| 7,506,155 B1 | 3/2009 | Stewart et al. |
| 7,506,170 B2 | 3/2009 | Finnegan |
| 7,506,364 B2 | 3/2009 | Vayman |
| 7,546,333 B2 | 6/2009 | Alon et al. |
| 7,546,594 B2 | 6/2009 | McGuire et al. |
| 7,552,479 B1 | 6/2009 | Conover et al. |
| 7,577,995 B2 | 8/2009 | Chebolu et al. |
| 7,603,552 B1 | 10/2009 | Sebes et al. |
| 7,607,170 B2 | 10/2009 | Chesla |
| 7,657,599 B2 | 2/2010 | Smith |
| 7,669,195 B1 | 2/2010 | Qumei |
| 7,685,635 B2 | 3/2010 | Vega et al. |
| 7,698,744 B2 | 4/2010 | Fanton et al. |
| 7,703,090 B2 | 4/2010 | Napier et al. |
| 7,739,497 B1 | 6/2010 | Fink et al. |
| 7,757,269 B1 | 7/2010 | Roy-Chowdhury et al. |
| 7,765,538 B2 | 7/2010 | Zweifel et al. |
| 7,783,735 B1 | 8/2010 | Sebes et al. |
| 7,809,704 B2 | 10/2010 | Surendran et al. |
| 7,818,377 B2 | 10/2010 | Whitney et al. |
| 7,823,148 B2 | 10/2010 | Deshpande et al. |
| 7,836,504 B2 | 11/2010 | Ray et al. |
| 7,840,968 B1 | 11/2010 | Sharma et al. |
| 7,849,507 B1 | 12/2010 | Bloch et al. |
| 7,853,643 B1 | 12/2010 | Martinez et al. |
| 7,856,661 B1 | 12/2010 | Sebes et al. |
| 7,865,931 B1 | 1/2011 | Stone et al. |
| 7,870,387 B1 | 1/2011 | Bhargava et al. |
| 7,873,955 B1 | 1/2011 | Sebes |
| 7,895,573 B1 | 2/2011 | Bhargava et al. |
| 7,908,653 B2 | 3/2011 | Brickell et al. |
| 7,937,455 B2 | 5/2011 | Saha et al. |
| 7,950,056 B1 | 5/2011 | Satish et al. |
| 7,966,659 B1 | 6/2011 | Wilkinson et al. |
| 7,996,836 B1 | 8/2011 | Mccorkendale et al. |
| 8,015,388 B1 | 9/2011 | Rihan et al. |
| 8,015,563 B2 | 9/2011 | Araujo et al. |
| 8,028,340 B2 | 9/2011 | Sebes et al. |
| 8,195,931 B1 | 6/2012 | Sharma et al. |
| 8,205,188 B2 | 6/2012 | Ramamoorthy et al. |
| 8,234,713 B2 | 7/2012 | Roy-Chowdhury et al. |
| 8,307,437 B2 | 11/2012 | Sebes et al. |
| 8,321,932 B2 | 11/2012 | Bhargava et al. |
| 8,332,929 B1 | 12/2012 | Bhargava et al. |
| 8,352,930 B1 | 1/2013 | Sebes et al. |
| 8,381,284 B2 | 2/2013 | Dang et al. |
| 8,515,075 B1 | 8/2013 | Saraf et al. |
| 8,539,063 B1 | 9/2013 | Sharma et al. |
| 8,544,003 B1 | 9/2013 | Sawhney et al. |
| 8,549,003 B1 | 10/2013 | Bhargava et al. |
| 8,549,546 B2 | 10/2013 | Sharma et al. |
| 8,555,404 B1 | 10/2013 | Sebes et al. |
| 8,561,051 B2 | 10/2013 | Sebes |
| 8,561,082 B2 | 10/2013 | Sharma et al. |
| 2002/0056076 A1 | 5/2002 | Made |
| 2002/0069367 A1 | 6/2002 | Tindal et al. |
| 2002/0083175 A1 | 6/2002 | Afek et al. |
| 2002/0099671 A1 | 7/2002 | Mastin Crosbie et al. |
| 2002/0114319 A1 | 8/2002 | Liu et al. |
| 2003/0014667 A1 | 1/2003 | Kolichtchak |
| 2003/0023736 A1 | 1/2003 | Abkemeier |
| 2003/0033510 A1 | 2/2003 | Dice |
| 2003/0065945 A1 | 4/2003 | Lingafelt et al. |
| 2003/0073894 A1 | 4/2003 | Chiang et al. |
| 2003/0074552 A1 | 4/2003 | Olkin et al. |
| 2003/0115222 A1 | 6/2003 | Oashi et al. |
| 2003/0120601 A1 | 6/2003 | Ouye et al. |
| 2003/0120811 A1 | 6/2003 | Hanson et al. |
| 2003/0120935 A1 | 6/2003 | Teal et al. |
| 2003/0145232 A1 | 7/2003 | Poletto et al. |
| 2003/0163718 A1 | 8/2003 | Johnson et al. |
| 2003/0167292 A1 | 9/2003 | Ross |
| 2003/0167399 A1 | 9/2003 | Audebert et al. |
| 2003/0200332 A1 | 10/2003 | Gupta et al. |

(56) References Cited

U.S. PATENT DOCUMENTS

| | | |
|---|---|---|
| 2003/0212902 A1 | 11/2003 | van der Made |
| 2003/0220944 A1 | 11/2003 | Lyman Schottland et al. |
| 2003/0221190 A1 | 11/2003 | Deshpande et al. |
| 2004/0003258 A1 | 1/2004 | Billingsley et al. |
| 2004/0015554 A1 | 1/2004 | Wilson |
| 2004/0051736 A1 | 3/2004 | Daniell |
| 2004/0054928 A1 | 3/2004 | Hall |
| 2004/0088398 A1 | 5/2004 | Barlow |
| 2004/0139206 A1 | 7/2004 | Claudatos et al. |
| 2004/0143749 A1 | 7/2004 | Tajalli et al. |
| 2004/0167906 A1 | 8/2004 | Smith et al. |
| 2004/0172551 A1 | 9/2004 | Fielding et al. |
| 2004/0230963 A1 | 11/2004 | Rothman et al. |
| 2004/0243678 A1 | 12/2004 | Smith |
| 2004/0255161 A1 | 12/2004 | Cavanaugh |
| 2004/0268149 A1 | 12/2004 | Aaron |
| 2005/0005006 A1 | 1/2005 | Chauffour et al. |
| 2005/0018651 A1 | 1/2005 | Yan et al. |
| 2005/0086047 A1 | 4/2005 | Uchimoto et al. |
| 2005/0091321 A1 | 4/2005 | Daniell et al. |
| 2005/0108516 A1 | 5/2005 | Balzer et al. |
| 2005/0108562 A1 | 5/2005 | Khazan et al. |
| 2005/0114672 A1 | 5/2005 | Duncan et al. |
| 2005/0132346 A1 | 6/2005 | Tsantilis |
| 2005/0198519 A1 | 9/2005 | Tamura et al. |
| 2005/0228990 A1 | 10/2005 | Kato et al. |
| 2005/0235360 A1 | 10/2005 | Pearson |
| 2005/0257207 A1 | 11/2005 | Blumfield et al. |
| 2005/0257265 A1 | 11/2005 | Cook et al. |
| 2005/0260996 A1 | 11/2005 | Groenendaal |
| 2005/0262558 A1 | 11/2005 | Usov |
| 2005/0273858 A1 | 12/2005 | Zadok et al. |
| 2005/0283823 A1 | 12/2005 | Okajo et al. |
| 2005/0289538 A1 | 12/2005 | Black-Ziegelbein et al. |
| 2006/0004875 A1 | 1/2006 | Baron et al. |
| 2006/0015501 A1 | 1/2006 | Sanamrad et al. |
| 2006/0037016 A1 | 2/2006 | Saha et al. |
| 2006/0072451 A1 | 4/2006 | Ross |
| 2006/0075478 A1 | 4/2006 | Hyndman et al. |
| 2006/0080656 A1 | 4/2006 | Cain et al. |
| 2006/0085785 A1 | 4/2006 | Garrett |
| 2006/0101277 A1 | 5/2006 | Meenan et al. |
| 2006/0133223 A1 | 6/2006 | Nakamura et al. |
| 2006/0136910 A1 | 6/2006 | Brickell et al. |
| 2006/0136911 A1 | 6/2006 | Robinson et al. |
| 2006/0143713 A1 | 6/2006 | Challener et al. |
| 2006/0195906 A1 | 8/2006 | Jin et al. |
| 2006/0200863 A1 | 9/2006 | Ray et al. |
| 2006/0230314 A1 | 10/2006 | Sanjar et al. |
| 2006/0236398 A1 | 10/2006 | Trakic et al. |
| 2006/0259734 A1 | 11/2006 | Sheu et al. |
| 2006/0277603 A1 | 12/2006 | Kelso et al. |
| 2007/0011746 A1 | 1/2007 | Malpani et al. |
| 2007/0028303 A1 | 2/2007 | Brennan |
| 2007/0033645 A1 | 2/2007 | Jones |
| 2007/0039049 A1 | 2/2007 | Kupferman et al. |
| 2007/0050579 A1 | 3/2007 | Hall et al. |
| 2007/0050764 A1 | 3/2007 | Traut |
| 2007/0074199 A1 | 3/2007 | Schoenberg |
| 2007/0083522 A1 | 4/2007 | Nord et al. |
| 2007/0101435 A1 | 5/2007 | Konanka et al. |
| 2007/0136579 A1 | 6/2007 | Levy et al. |
| 2007/0143851 A1 | 6/2007 | Nicodemus et al. |
| 2007/0157303 A1 | 7/2007 | Pankratov |
| 2007/0169079 A1 | 7/2007 | Keller et al. |
| 2007/0192329 A1 | 8/2007 | Croft et al. |
| 2007/0220061 A1 | 9/2007 | Tirosh et al. |
| 2007/0220507 A1 | 9/2007 | Back et al. |
| 2007/0253430 A1 | 11/2007 | Minami et al. |
| 2007/0256138 A1 | 11/2007 | Gadea et al. |
| 2007/0271561 A1 | 11/2007 | Winner et al. |
| 2007/0300215 A1 | 12/2007 | Bardsley |
| 2008/0005737 A1 | 1/2008 | Saha et al. |
| 2008/0005798 A1 | 1/2008 | Ross |
| 2008/0010304 A1 | 1/2008 | Vempala et al. |
| 2008/0022384 A1 | 1/2008 | Yee et al. |
| 2008/0034416 A1 | 2/2008 | Kumar et al. |
| 2008/0034418 A1 | 2/2008 | Venkatraman et al. |
| 2008/0052468 A1 | 2/2008 | Speirs et al. |
| 2008/0082977 A1 | 4/2008 | Araujo et al. |
| 2008/0120499 A1 | 5/2008 | Zimmer et al. |
| 2008/0141371 A1 | 6/2008 | Bradicich et al. |
| 2008/0163207 A1 | 7/2008 | Reumann et al. |
| 2008/0163210 A1 | 7/2008 | Bowman et al. |
| 2008/0165952 A1 | 7/2008 | Smith et al. |
| 2008/0184373 A1 | 7/2008 | Traut et al. |
| 2008/0235534 A1 | 9/2008 | Schunter et al. |
| 2008/0282080 A1 | 11/2008 | Hyndman et al. |
| 2008/0294703 A1 | 11/2008 | Craft et al. |
| 2008/0301770 A1 | 12/2008 | Kinder |
| 2009/0007100 A1 | 1/2009 | Field et al. |
| 2009/0038017 A1 | 2/2009 | Durham et al. |
| 2009/0043993 A1 | 2/2009 | Ford et al. |
| 2009/0055693 A1 | 2/2009 | Budko et al. |
| 2009/0063665 A1 | 3/2009 | Bagepalli et al. |
| 2009/0113110 A1 | 4/2009 | Chen et al. |
| 2009/0144300 A1 | 6/2009 | Chatley et al. |
| 2009/0150639 A1 | 6/2009 | Ohata |
| 2009/0249053 A1 | 10/2009 | Zimmer et al. |
| 2009/0249438 A1 | 10/2009 | Litvin et al. |
| 2009/0320140 A1 | 12/2009 | Sebes et al. |
| 2009/0328144 A1 | 12/2009 | Sherlock et al. |
| 2009/0328185 A1 | 12/2009 | Berg et al. |
| 2010/0049973 A1 | 2/2010 | Chen |
| 2010/0071035 A1 | 3/2010 | Budko et al. |
| 2010/0100970 A1 | 4/2010 | Roy-Chowdhury et al. |
| 2010/0114825 A1 | 5/2010 | Siddegowda |
| 2010/0138430 A1 | 6/2010 | Gotou |
| 2010/0188976 A1 | 7/2010 | Rahman et al. |
| 2010/0250895 A1 | 9/2010 | Adams et al. |
| 2010/0281133 A1 | 11/2010 | Brendel |
| 2010/0293225 A1 | 11/2010 | Sebes et al. |
| 2010/0332910 A1 | 12/2010 | Ali et al. |
| 2011/0029772 A1 | 2/2011 | Fanton et al. |
| 2011/0035423 A1 | 2/2011 | Kobayashi et al. |
| 2011/0047542 A1 | 2/2011 | Dang et al. |
| 2011/0047543 A1 | 2/2011 | Mohinder |
| 2011/0077948 A1 | 3/2011 | Sharma et al. |
| 2011/0078550 A1 | 3/2011 | Nabutovsky |
| 2011/0093842 A1 | 4/2011 | Sebes |
| 2011/0093950 A1 | 4/2011 | Bhargava et al. |
| 2011/0113467 A1 | 5/2011 | Agarwal et al. |
| 2011/0119760 A1 | 5/2011 | Sebes et al. |
| 2011/0138461 A1 | 6/2011 | Bhargava et al. |
| 2011/0302647 A1 | 12/2011 | Bhattacharya et al. |
| 2012/0030731 A1 | 2/2012 | Bhargava et al. |
| 2012/0030750 A1 | 2/2012 | Bhargava et al. |
| 2012/0216271 A1 | 8/2012 | Cooper et al. |
| 2012/0278853 A1 | 11/2012 | Roy-Chowdhury et al. |
| 2012/0290827 A1 | 11/2012 | Bhargava et al. |
| 2012/0290828 A1 | 11/2012 | Bhargava et al. |
| 2012/0297176 A1 | 11/2012 | Bhargava et al. |
| 2013/0024934 A1 | 1/2013 | Sebes et al. |
| 2013/0091318 A1 | 4/2013 | Bhattacharjee et al. |
| 2013/0097355 A1 | 4/2013 | Dang et al. |
| 2013/0097356 A1 | 4/2013 | Dang et al. |
| 2013/0097658 A1 | 4/2013 | Cooper et al. |
| 2013/0097692 A1 | 4/2013 | Cooper et al. |
| 2013/0117823 A1 | 5/2013 | Dang et al. |
| 2013/0246044 A1 | 9/2013 | Sharma et al. |
| 2013/0246393 A1 | 9/2013 | Saraf et al. |
| 2013/0246423 A1 | 9/2013 | Bhargava et al. |
| 2013/0246685 A1 | 9/2013 | Bhargava et al. |
| 2013/0247016 A1 | 9/2013 | Sharma et al. |
| 2013/0247027 A1 | 9/2013 | Shah et al. |
| 2013/0247032 A1 | 9/2013 | Bhargava et al. |
| 2013/0247181 A1 | 9/2013 | Saraf et al. |
| 2013/0247192 A1 | 9/2013 | Krasser et al. |
| 2013/0247226 A1 | 9/2013 | Sebes et al. |

FOREIGN PATENT DOCUMENTS

| | | |
|---|---|---|
| EP | 1 482 394 A2 | 12/2004 |
| EP | 2 037 657 A1 | 3/2009 |

(56) References Cited

FOREIGN PATENT DOCUMENTS

| | | |
|---|---|---|
| EP | 2599026 | 6/2013 |
| EP | 2599276 | 6/2013 |
| JP | 2004/524598 A | 8/2004 |
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2008/054997 A2 | 5/2008 |
| WO | WO 2011/059877 | 5/2011 |
| WO | WO 2012/015485 | 2/2012 |
| WO | WO 2012/015489 | 2/2012 |
| WO | WO 2012/116098 | 8/2012 |
| WO | WO 2013/058940 | 4/2013 |
| WO | WO 2013/058944 | 4/2013 |

OTHER PUBLICATIONS

"McAfee Management for Optimized Virtual Environments," copyright 2012, retrieved on Nov. 26, 2012 at AntiVirushttp://www.mcafee.com/us/resources/data-sheets/ds-move-anti-virus.pdf, 2 pages.

Rivest, R., "The MD5 Message-Digest Algorithm", RFC 1321, Apr. 1992, retrieved on Dec. 14, 2012 from http://www.ietf.org/rfc/rfc1321.txt, 21 pages.

Hinden, R. and B. Haberman, "Unique Local IPv6 Unicast Addresses", RFC 4193, Oct. 2005, retrieved on Nov. 20, 2012 from http://tools.ietf.org/pdf/rfc4193.pdf, 17 pages.

"Secure Hash Standard (SHS)", Federal Information Processing Standards Publication, FIPS PUB 180-4, Mar. 2012, retrieved on Dec. 14, 2012 from http://csrc.nist.gov/publications/fips/fips180-4/fips-180-4.pdf, 35 pages.

U.S. Appl. No. 13/728,705, filed Dec. 27, 2012, entitled "Herd Based Scan Avoidance System in a Network Environment," Inventor(s) Venkata Ramanan, et al.

An Analysis of Address Space Layout Randomization on Windows Vista™, Symantec Advanced Threat Research, copyright 2007 Symantec Corporation, available at http://www.symantec.com/avcenter/reference/Address_Space_Layout_Randomization.pdf, 19 pages.

Bhatkar, et al., "Efficient Techniques for Comprehensive Protection from Memory Error Exploits," USENIX Association, 14th USENIX Security Symposium, Aug. 1-5, 2005, Baltimore, MD, 16 pages.

Dewan, et al., "A Hypervisor-Based System for Protecting Software Runtime Memory and Persistent Storage," Spring Simulation Multiconference 2008, Apr. 14-17, 2008, Ottawa, Canada, (available at website: www.vodun.org/papers/2008_secure_locker_submit_v1-1.pdf, printed Oct. 11, 2011), 8 pages.

Shacham, et al., "On the Effectiveness of Address-Space Randomization," CCS'04, Oct. 25-29, 2004, Washington, D.C., Copyright 2004, 10 pages.

International Search Report and Written Opinion mailed Dec. 14, 2012 for International Application No. 04796-1087WO, 9 pages.

International Preliminary Report on Patentability and Written Opinion issued Jan. 29, 2013 for International Application No. PCT/US2011/020677 (9 pages).

International Preliminary Report on Patentability and Written Opinion issued Jan. 29, 2013 for International Application No. PCT/US2011/024869 (6 pages).

"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).

Eli M. Dow, et al., "The Xen Hypervisor," Informit, dated Apr. 10, 2008, http://www.informit.com/articles/printerfriendly.aspx?p=1187966, printed Aug. 11, 2009 (13 pages).

U.S. Appl. No. 10/651,591, entitled "Method and System for Containment of Networked Application Client Software by Explicit Human Input," filed Aug. 29, 2003, Inventor(s): Rosen Sharma et al.

U.S. Appl. No. 11/379,953, entitled "Software Modification by Group to Minimize Breakage," filed Apr. 24, 2006, Inventor(s): E. John Sebes et al.

U.S. Appl. No. 12/291,232, entitled "Method of and System for Computer System State Checks," filed Nov. 7, 2008, inventor(s): Rishi Bhargava et al.

U.S. Appl. No. 12/426,859, entitled "Method of and System for Reverse Mapping Vnode Pointers," filed Apr. 20, 2009, Inventor(s): Suman Saraf et al.

U.S. Appl. No. 12/322,220, entitled "Method of and System for Malicious Software Detection Using Critical Address Space Protection," filed Jan. 29, 2009, Inventor(s): Suman Saraf et al.

U.S. Appl. No. 12/322,321, entitled "Method of and System for Computer System Denial-of-Service Protection," filed Jan. 29, 2009, Inventor(s): Suman Saraf et al.

Desktop Management and Control, Website: http://www.vmware.com/solutions/desktop/, printed Oct. 12, 2009, 1 page.

Secure Mobile Computing, Website: http://www.vmware.com/solutions/desktop/mobile.html, printed Oct. 12, 2009, 2 pages.

U.S. Appl. No. 12/615,521, entitled "System and Method for Preventing Data Loss Using Virtual Machine Wrapped Applications," filed Nov. 10, 2009, Inventor(s): Sonali Agarwal, et al. [Published 2011/0113467 on May 12, 2011].

U.S. Appl. No. 12/636,414, entitled "System and Method for Managing Virtual Machine Configurations," filed Dec. 11, 2009, Inventor(s): Harvinder Singh Sawhney, et al.

U.S. Appl. No. 11/437,317, entitled "Connectivity-Based Authorization," filed May 18, 2006, Inventor(s): E. John Sebes et al.

U.S. Appl. No. 12/880,125, entitled "System and Method for Clustering Host Inventories," filed Sep. 12, 2010, Inventor(s) Rishi Bhargava, et al.

U.S. Appl. No. 12/903,993, entitled "Method and System for Containment of Usage of Language Interfaces," filed Oct. 13, 2010, Inventor(s) Rosen Sharma, et al.

Barrantes et al., "Randomized Instruction Set Emulation to Dispurt Binary Code Injection Attacks," Oct. 27-31, 2003, ACM, pp. 281-289.

Gaurav et al., "Countering Code-Injection Attacks with Instruction-Set Randomization," Oct. 27-31, 2003, ACM, pp. 272-280.

U.S. Appl. No. 13/012,138, entitled "System and Method for Selectively Grouping and Managing Program Files," filed Jan. 24, 2011, Inventor(s) Rishi Bhargava, et al.

Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.

Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.

Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.

Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.

Tal Garfinkel, et al., "Terra: A Virtual Machine-Based Platform for Trusted Computing," XP-002340992, SOSP'03, Oct. 19-22, 2003, 14 pages.

U.S. Appl. No. 13/037,988, entitled "System and Method for Botnet Detection by Comprehensive Email Behavioral Analysis," filed Mar. 1, 2011, Inventor(s) Sven Krasser, et al.

U.S. Appl. No. 12/946,344, entitled "Method and System for Containment of Usage of Language Interfaces," filed Nov. 15, 2010, Inventor(s) Rosen Sharma, et al.

(56) References Cited

OTHER PUBLICATIONS

A-32 Intel® Architecture Software Developer's Manual, vol. 3B; Jun. 2006; pp. 13, 15, 22 and 145-146.
Notification of International Preliminary Report on Patentability and Written Opinion mailed May 24, 2012 for International Application No. PCT/US2010/055520, 5 pages.
Sailer et al., sHype: Secure Hypervisor Approach to Trusted Virtualized Systems, IBM research Report, Feb. 2, 2005, 13 pages.
U.S. Application U.S. Appl. No. 13/558,277, entitled "Method and Apparatus for Process Enforced Configuration Management," filed Jul. 25, 2012, Inventor(s) Rishi Bhargava et al.
Kurt Gutzmann, "Access Control and Session Management in the HTTP Environment," Jan./Feb. 2001, pp. 26-35, IEEE Internet Computing.
U.S. Appl. No. 11/060,683, entitled "Distribution and Installation of Solidified Software on a Computer," filed Feb. 16, 2005, Inventor(s): Bakul Shah et al.
Myung-Sup Kim et al., "A load cluster management system using SNMP and web", [Online], May 2002, pp. 367-378, [Retrieved from Internet on Oct. 24, 2012], <http://onlinelibrary.wiley.com/doi/10.1002/nem.453/pdf>.
G. Pruett et al., "BladeCenter systems management software", [Online], Nov. 2005, pp. 963-975, [Retrieved from Internet on Oct. 24, 2012], <http://citeseerx.1st.psu.edu/viewdoc/download?doi=1.1.1.91.5091&rep=rep1&type=pdf>.
Philip M. Papadopoulos et al., "NPACI Rocks: tools and techniques for easily deploying manageable Linux clusters" [Online], Aug. 2002, pp. 707-725, [Retrieved from internet on Oct. 24, 2012], <http://onlinelibrary.wiley.com/doi/10.1002/cpe.722/pdf>.
Thomas Staub et al., "Secure Remote Management and Software Distribution for Wireless Mesh Networks", [Online], Sep. 2007, pp. 1-8, [Retrieved from Internet on Oct. 24, 2012], <http://cds.unibe.ch/research/pub_files/B07. pdf>.
USPTO Jun. 5, 2013 Notice of Allowance from U.S. Appl. No. 11/437,317.
USPTO Jun. 10, 2013 Notice of Allowance from U.S. Appl. No. 12/976,159.
Datagram Transport Layer Security Request for Comments 4347, E. Rescorla, et al., Stanford University, Apr. 2006, retrieved and printed on Oct. 17, 2011 from http://tools.ietf.org/pdf/rfc4347.pdf, 26 pages.
Internet Control Message Protocol Request for Comments 792, J. Postel, ISI, Sep. 1981, retrieved and printed on Oct. 17, 2011 from http://tools.ietf.org/html/rfc792, 22 pages.
Mathew J. Schwartz, "Palo Alto Introduces Security for Cloud, Mobile Users," retrieved Feb. 9, 2011 from http://www.informationweek.com/news/security/perimeter/showArticled.jtml?articleID-22, 4 pages.
Requirements for IV Version 4 Routers Request for Comments 1812, F. Baker, Cisco Systems, Jun. 1995, retrieved and printed on Oct. 17, 2011 from http://tools.ietf.org/pdf/rfc1812.pdf, 176 pages.
The Keyed-Hash Message Authentication Code (HMAC), FIPS PUB 198, Issued Mar. 6, 2002, Federal Information Processing Standards Publication, retrieved and printed on Oct. 17, 2011 from http://csrc.nist.gov/publications/fips/fips198/fips-198a.pdf, 20 pages.
Zhen Chen et al., "Application Level Network Access Control System Based on TNC Architecture for Enterprise Network," In: Wireless communications Networking and Information Security (WCNIS), 2010 IEEE International Conference, Jun. 25-27, 2010 (5 pages).
USPTO Dec. 24, 2012 Nonfinal Office Action from U.S. Appl. No. 13/032,851.
USPTO Jul. 16, 2013 Final Office Action from U.S. Appl. No. 13/032,851.
International Search Report and Written Opinion, International Application No. PCT/US2012/026169, mailed Jun. 18, 2012, 11 pages.
USPTO Feb. 28, 2013 Nonfinal Office Action from U.S. Appl. No. 13/275,249.
International Search Report and Written Opinion, International Application No. PCT/US2012/057312, mailed Jan. 31, 2013, 10 pages.
USPTO Mar. 1, 2013 Nonfinal Office Action from U.S. Appl. No. 13/275,196.
International Search Report and Written Opinion, International Application No. PCT/US2012/057153, mailed Dec. 26, 2012, 8 pages.
U.S. Appl. U.S. Appl. No. 13/437,900, filed Apr. 2, 2012, entitled "System and Method for Interlocking a Host and a Gateway," Inventors: Geoffrey Howard Cooper, et al.
USPTO Mar. 1, 2013 Nonfinal Office Action from U.S. Appl. No. 13/437,900.
USPTO Sep. 13, 2013 Final Office Action from U.S. Appl. No. 13/275,249.
Narten et al., RFC 4861, "Neighbor Discovery for IP version 6 (IPv6)", Sep. 2007, retrieved from http://tools.ietf.org/html/rfc4861, 194 pages.
International Preliminary Report on Patentability, International Application No. PCT/US2012/026169, mailed Aug. 27, 2013, 8 pages.
USPTO Oct. 2, 2013 Final Office Action from U.S. Appl. No. 13/275,196.
USPTO Oct. 4, 2013 Nonfinal Office Action from U.S. Appl. No. 12/844,892.
USPTO Oct. 25, 2013 Nonfinal Office Action from U.S. Appl. No. 12/844,964.
U.S. Appl. No. 14/045,208, filed Oct. 3, 2013, entitled "Execution Environment File Inventory," Inventors: Rishi Bhargava, et al.
PCT Application Serial No. PCT/US13/66690, filed Oct. 24, 2013, entitled "Agent Assisted Malicious Application Blocking in a Network Environment,", 67 pages.
Patent Examination Report No. 1, Australian Application No. 2011283160, mailed Oct. 30, 2013.
USPTO Sep. 27, 2013, Notice of Allowance from U.S. Appl. No. 13/437,900.
PCT Application U.S. Appl. No. PCT/US13/71327, filed Nov. 21, 2013, entitled "Herd Based Scan Avoidance System in a Network Environment,", 46 pages.
USPTO Dec. 4, 2013 Nonfinal Office Action from U.S. Appl. No. 13/032,851.
U.S. Appl. No. 14/127,395, entitled "Agent Assisted Malicious Application Blocking in a Network Environment," filed Dec. 18, 2013, Inventors: Chandan CP et al.
USPTO Dec. 26, 2013 Notice of Allowance from U.S. Appl. No. 13/275,249.
USPTO Dec. 16, 2013 Notice of Allowance from U.S. Appl. No. 13/275,196.
USPTO Jan. 13, 2014 Notice of Allowance from U.S. Appl. No. 13/437,900.
Patent Examination Report No. 1, Australian Application No. 2011283164, mailed Jan. 14, 2014.

\* cited by examiner ant lication is a continuation (and claims the benefit of priority under 35 U.S.C. §120) of pending U.S. application Ser. No. 12/944,567, filed Nov. 11, 2010, entitled, "CLASSIFICATION OF SOFTWARE ON NETWORKED SYSTEMS," by inventors E. John Sebes, et al., which application is a divisional of U.S. application Ser. No. 11/182,320, filed Jul. 14, 2005, entitled, "CLASSIFICATION OF SOFTWARE ON NETWORKED SYSTEMS," by inventors E. John Sebes, et al., issued as U.S. Pat. No. 7,856,661 on Dec. 21, 2010. The disclosure of the prior applications are considered part of (and are incorporated by reference in) the disclosure of this application.

CLASSIFICATION OF SOFTWARE ON NETWORKED SYSTEMS

RELATED APPLICATION

This application is a continuation (and claims the benefit of priority under 35 U.S.C. §120) of pending U.S. application Ser. No. 12/944,567, filed Nov. 11, 2010, entitled, "CLASSIFICATION OF SOFTWARE ON NETWORKED SYSTEMS," by inventors E. John Sebes, et al., which application is a divisional of U.S. application Ser. No. 11/182,320, filed Jul. 14, 2005, entitled, "CLASSIFICATION OF SOFTWARE ON NETWORKED SYSTEMS," by inventors E. John Sebes, et al., issued as U.S. Pat. No. 7,856,661 on Dec. 21, 2010. The disclosure of the prior applications are considered part of (and are incorporated by reference in) the disclosure of this application.

BACKGROUND

1. Field

The present invention relates generally to computer systems, and in particular to protecting computer systems from unauthorized software.

2. Related Art

The set of software available for execution on a computer is generally dynamic and modifiable, even when such modification is not desirable. To restrict the ability of users or administrators of a computer to install and remove software or to modify configuration of the existing software, a filter is often used to manage software access to the computer from a network. However, the filtering is based on the behavior of the software or a set of rules or policies. Filtering in this manner is inefficient and limited in reliability, as malicious software often disguises its behavior or is specifically created to traverse the rules.

Accordingly, there is need for a method and system for the classification of software on networked systems. The method and system should definitively determine the authority of software to execute on a computing system, rather than on heuristics or rules or policies. The present invention addresses such a need.

SUMMARY

A method and system for the classification of software on networked systems, includes: determining a software received by a sensor is attempting to execute on a computer system of the sensor, classifying the software as authorized or unauthorized to execute, and gathering information on the software by the sensor if the software is classified as unauthorized to execute. The sensor sends the information on the software to one or more actuators, which determine whether or not to act on one or more targets based on the information. If so, then the actuator sends a directive to the target(s). The target(s) updates its responses according to the directive. The classification of the software is definitive and is not based on heuristics or rules or policies and without any need to rely on any a priori information about the software.

DETAILED DESCRIPTION

Figure 1:
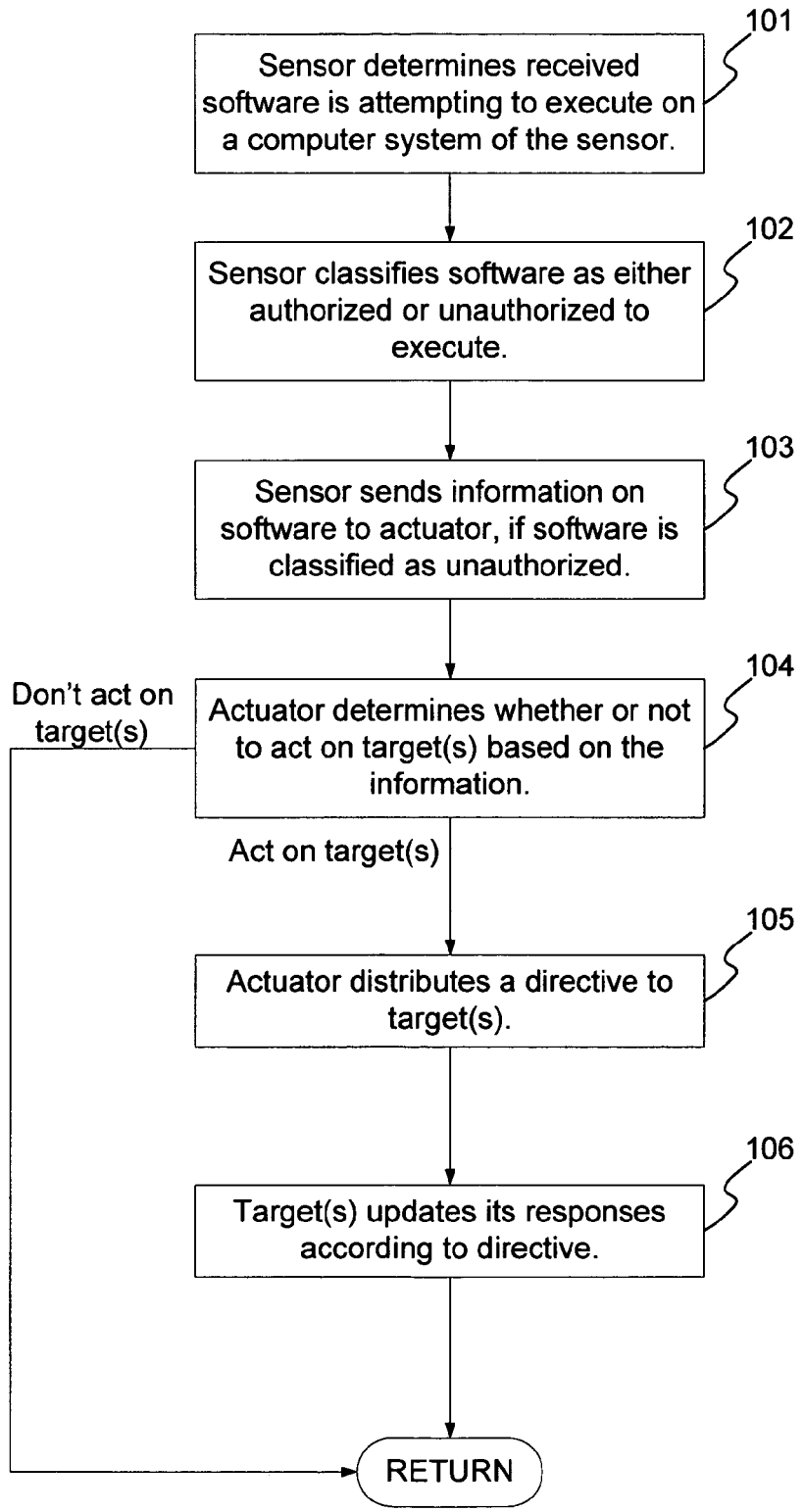
FIG. 1 is a flowchart illustrating a preferred embodiment of a method for the classification of software in accordance with the present invention.

Glossary:

Computing system (hereinafter also referred to as a computer): any system serving as a computing machine and capable of network communication some or all of the time. Example computing systems are workstations, servers and server groups, clusters of computers, personal computers (PCs), embedded systems, networked consoles such as travel reservation consoles, networked kiosks such as automated teller machines (ATMs), mobile or wireless devices, set-top boxes, or any other computing hardware that can send and/or receive data or otherwise communicate via one or more network nodes.

Network-Node: any computing system behaves as a Network-Node when it acts as a facilitator of network communication between two or more computing systems. Example Network Nodes are routers, switches, hardware or software firewalls, intrusion prevention systems, intrusion detection systems, and any other computing system facilitating network communication.

End-System: any computing system behaves as an End-System when it can communicate with other computing systems via one or more Network-Nodes in a network. In a network topology represented by a graph, an End-System is typically represented by a "leaf" whereas a Network-Node is generally a non-leaf internal vertex. Though not typical, a computing system that behaves as an End-System may also behave as a Network-Node, for example by performing some amount of routing.

Sensor: a computing system behaves as a Sensor when it collects information about software that attempts execution on that computing system. A Sensor can be an End-System or a Network-Node.

Actuator: a computing system behaves as an Actuator when it receives information from one or more Sensors and can act or not act upon one or more Targets (as defined below) based on an examination of the received information. As presented herein, an Actuator uses information supplied by Sensors in a network in order to assess any potential effects of software that is traveling within the network, and in response to act upon one or more Targets in an attempt to contain the effects, to deny further entry of such software into the network, to further study the propagation or other behavior of such software in the network, and/or to perform any other tasks relevant to identifying and blocking unauthorized software on networked systems.

Target: a computing system behaves as a Target when it comprises a functionality or mechanism by which it can be acted upon by an Actuator. An example Target is a Network-Node that can restrict network traffic based on directives or information received from an Actuator.

Source: a computing system behaves as a Source when it is a point of origin (or transition) for a piece of software that is traveling via a network from the Source to a Target. A Source can be an End-System or a Network-Node.

Destination: a computing system behaves as a Destination when it represents a potential destination for software originating from (or transitioning through) a Source. A Destination represents a computing system on which such software may attempt to execute some time after arrival, or from which such software may attempt to travel or propagate to other Destinations (in which case the Destination behaves also as a Source of that software).

Manager: a computing system behaves as a Manager when it manages software on one or more other computing systems. Example Managers are computing systems that update virus or malware definitions on other computing systems which have anti-virus or anti-malware software installed, computing systems that install software patches on other computing systems, computing systems that update software firewall rules on other computing systems that have a software firewall installed, etc.

DESCRIPTION

A Sensor classifies pieces of software that attempt to execute on the Sensor (i.e. attempt to execute on the Sensor's underlying computing system) as either authorized to execute on the Sensor or not authorized to execute on the Sensor, and sends data relating to unauthorized pieces of software to one or more Actuators. An Actuator analyzes the data and generates directives for Targets, thereby influencing the Targets' behavior in an attempt to mitigate potentially harmful effects of such unauthorized software.

In one embodiment, the Sensor has a set of identifiers for identifying a set of software that the Sensor considers authorized to execute on the Sensor, and considers any piece of software that is not a member of this set of authorized software as unauthorized. This represents a definitive classification of all known and unknown software, without any need to rely on any a priori information about software that is considered unauthorized.

In order for a Sensor to classify a piece of software that is attempting execution, the Sensor intercepts the software's attempt at execution and examiners (partially or completely) the set of bits constituting the software.

The execution interception can be achieved in a number of ways. In one embodiment, the Sensor uses an operating system (OS)-provided application programming interface (API) to specify to the OS a "white list" of pieces of software considered authorized by the Sensor (such as an API provided by the Solaris™ OS for this purpose) and requests notification by the OS of execution attempts of unauthorized pieces of software (i.e. any software not on the "white list"). In another embodiment, the Sensor intercepts the OS's mechanism of receiving a request to execute a piece of software, or other APIs provided by the OS, and prior or after the execution of the software determines whether the piece of software is authorized or not. This approach allows recognition of code that travels through a network and attempts execution on a computing system (such as an email attachment or a downloaded piece of code) and allows recognition of code that is injected into a running process (such as in a buffer overflow attack). Such capabilities are described in more detail in U.S. patent application entitled "Damage Containment by Translation", Ser. No. 10/651,588 filed on Aug. 29, 2003, issued as U.S. Pat. No. 7,464,408 on Dec. 9, 2008, and in U.S. patent application entitled "Method and system for containment of Usage of Language Interfaces", Ser. No. 10/739,230 filed on Dec. 17, 2003, issued as U.S. Pat. No. 7,840,968 on Nov. 23, 2010, both assigned to the assignee of the present application. Applicant hereby incorporates these patents by reference.

The determination of whether a piece of software attempting execution is authorized to execute on a Sensor or not can also be done in a number of ways. One approach is for the Sensor to generate an identifier for the piece of software and check whether the generated identifier is a member of a set of identifiers ("authorized identifiers") representing pieces of software authorized to execute on the Sensor. For example, an identifier may be any form of hash, checksum or message digest (e.g. a function from the Secure Hash Algorithm (SHA) family of cryptographic hash functions, the Message Digest algorithm 5 hash function, etc.) evaluated on all or part of the set of bits representing the piece of software, in which case the Sensor will have a set of hash or checksum or message digest values representing authorized identifiers. An identifier may be an OS file name of the piece of software attempting execution, in which case the Sensor will have a set of OS file names representing authorized identifiers (i.e. files authorized to execute on the Sensor). An identifier may be an OS file system internal designator (such as an inode), in which case the Sensor will have a set of corresponding OS file system internal designators representing authorized identifiers. An identifier may be an OS or file system attribute or meta-data. In general, the Sensor may use any combination of the above example identifiers, or any other identifier which can be generated for a piece of software that is attempting execution and compared against a set of corresponding authorized identifiers in order to classify the piece of software as authorized or unauthorized to execute.

In another complimentary approach, a piece of software may already be executing on the computing system of the Sensor, and the Sensor may determine that the piece of software is actually unauthorized to execute based on a specific API access attempted by the piece of software. This is described in more detail in the above referenced U.S. patent application Ser. Nos. 10/651,588 and 10/739,230, issued as U.S. Pat. Nos. 7,464,408 and 7,840,968, respectively, and in the U.S. patent application entitled "Solidifying the Executable Software Set of a Computer", Ser. No. 10/935,772, filed on Sep. 7, 2004, issued as U.S. Pat. No. 7,873,955 on Jan. 18, 2011. Applicant hereby incorporates U.S. Pat. No. 7,873,955 by reference.

Optionally, a Sensor may be "solidified" in which case it can determine whether a piece of software that is attempting execution is authorized or not, and can also proactively block such unauthorized execution. The "solidification" of a computing system is described in more detail in the above referenced U.S. Pat. No. 7,873,955.

Once a Sensor classifies a piece of software as unauthorized to execute, the Sensor prepares data about the particular execution attempt of the piece of software, collects any ancillary data that may be relevant to an Actuator for analyzing the execution attempt and generating related directives for Targets, and sends this data to one or more Actuators. There are several examples of such ancillary data. As an example, for a piece of unauthorized software which arrives via a network, the Sensor can send one or more network packets which encoded the piece of software. The Sensor can indicate the source and destination IP address and ports, a packet payload signature and/or packet header signature (hash or checksum or message digest), etc. since this information can be useful to Targets that can recognize and possibly filter out such packets in the future. Example Targets include network level pattern matching and packet filtering elements such as packet filters, intrusion detection systems or intrusion prevention systems. The Sensor may correlate network packets with the unauthorized software by time of execution attempt, by matching a checksum of the software with a checksum of a pattern in a network packet, or by any other information available to the Sensor that could be correlated with the unauthorized software and serve as potentially useful information for one or more appropriate Targets for the purpose of identifying or blocking other instances (copies) of the software. The Sensor may keep a set of recent network packets for this purpose. As another example of such ancillary data, for a piece of software that attempts execution and is identified as unauthorized via a checksum comparison, the Sensor can send the checksum of the software to an Actuator, since this information can be useful to those Targets types (such as email servers, file transfer servers, internet proxies, etc.) that can recognize and possibly filter out pieces of software (such as email attachments, files, browser downloads, etc.) based on checksums or other similar functions.

The power of the present approach to classify software on networked computing system stems in part from the following two facts:

(a) A Sensor provides definitive, accurate, real-time classification of software as unauthorized to execute on the Sensor. This information is definite and not a guess based on heuristics or rules or policies, in contrast with intrusion detection or intrusion prevention systems that rely on rules and heuristics. This information is not dependent on a priori knowledge about the specific software itself, in contrast with other approaches that use a prior information about unauthorized software in order to identify such software, such as anti-virus systems depending on virus signatures requiring updates.

(b) A Sensor provides data on such unauthorized software to an Actuator which in turn can act on one or more Targets in a network in order to mitigate the effects of such unauthorized software.

FIG. 1 is a flowchart illustrating a preferred embodiment of a method for the classification of software in accordance with the present invention. First, a Sensor determines that received software is attempting to execute on the computing system of the Sensor, via step 101. The Sensor then classifies the software as either authorized or unauthorized to execute on the computing system, via step 102. If the software is unauthorized to execute, the Sensor sends information on the software to an Actuator, via step 103. The information can be sent in the form of a log, a report, or a response to a poll initiated by the Actuator. As described above, this information is definite and not a guess based on heuristics or rules or policies nor dependent on a priori knowledge on the specific software itself. Based on the information, the Actuator determines whether or not to act on a Target, via step 104. Here, the Actuator examines the information as input and outputs a directive that is actionable by a Target. If the Actuator decides to act on a Target, the directive of the examination is distributed to the Target, via step 105. The Target then updates it responses according to the directive, via step 106.

An Actuator's examination of Sensor-provided information and any resulting actions on Targets (i.e. directives or instructions sent to Targets) generally proceeds as follows:

(a) Collation: The Actuator collates one or more pieces of Sensor-provided data comprising information about one or more execution attempt instances of an unauthorized piece of software (which may be potentially harmful or malicious). The pieces of data are provided by one or more Sensors and at one or more points in time, as described above.

(b) Determining information that can be used to identify potentially malicious software: The Actuator examines the collated data and determines what subset (if any) of the data can represent a useful identifier of the corresponding unauthorized piece of software that initiated the provision of such data by a Sensor in the first place. Broadly, such an identifier is generally useful for an element of a network (such as Network-Nodes, intrusion prevention/detection systems, packet filters, etc.), for an element of an OS file system, or for an element of an OS's memory subsystem (such as stack pattern checkers, performance monitoring systems, etc.). For example, if a piece of unauthorized software that attempts execution on a Sensor is a Perl script, the Actuator may choose to use as an identifier the string "#!/bin/perl" to be matched by a Network-Node Target in order to restrict or fully block propagation of Perl scripts through a network, or to be matched by a Target's OS file system against the first few bytes of any piece of software that attempts execution in order to prevent Perl scripts from executing on the Targets. Other examples were described above.

(c) Identification of a particular Target type that can be driven by the subset of data representing the identifier. As described above, the information determined as potentially useful inherently implies such Target types that can act on such identifier information.

(d) Construction of a directive for the identified Target type, and distributing the directive to one or more identified Targets of the Target type, as described above.

Note that an Actuator may not necessarily be implemented as a monolithic system, but may optionally be represented by a set of distributed components, such as a collection component for gathering Sensor-provided data, an analyzer component for mining said data and identifying Target types and appropriate directives, and a distributor component for distributing the generated directives to one or more Targets of the identified Target type.

Note also that the notion of identification in item (b) above differs from the identification performed by a Sensor. While a Sensor uses identifiers to classify pieces of software as authorized or unauthorized to execute, and sends data about specific pieces of unauthorized software to an Actuator, an Actuator uses such Sensor-provided data to determine what (if any) subset of such data can be useful to one or more Target types for the purpose of identifying and possibly blocking such software in the future, when such software is in transit in a network or after such software arrives on a computing system connected to the network. Furthermore, note that while a Sensor's classification of a piece of software into authorized to execute versus not authorized to execute is definitive and does not rely on guesses or heuristics as described above, an Actuator's analysis of Sensor-provided information and resulting generation and distribution of actionable directives to one or more Targets may use any logic, such as heuristics, rules or policies based on best guesses, partial information, user input, historical context, etc.

Optionally, confirmation from a user can be injected at any of the illustrated steps. This user input is further described in co-pending U.S. patent application entitled, "Method and System for Containment of Networked Application Client Software By Explicit Human Input", Ser. No. 10/651,591, filed on Aug. 29, 2003, and assigned to the assignee of the present application. Applicant hereby incorporates this patent application by reference.

In one embodiment, the examination of Sensor-provided information includes an assessment of the risk involved in allowing the software to execute. For example, a Sensor can be initially configured to allow the execution of the software, but upon an examination of the information on the software by the Actuator (and optionally the assessment of the information within a context represented by other information received from one or more other Sensors), the risk may be determined to exceed a certain threshold. This result is distributed to one or more Targets, which then update their responses to block subsequent attempted executions of this software. The updates can vary in scope, in the degree of change in response, and in number of Targets to be changed. For example, if the software is received from a Source, a Target can be updated to only block subsequent attempted executions of this software received from the same Source, but a subsequent attempted execution of this software received from another Source would be allowed to execute. For another example, the block can apply only to subsequent attempted executions received from Sources within a class of IP addresses, apply to all subsequent attempted executions of the software regardless of the Source, apply to subsequent attempted executions at particular Destinations, or apply to any Destination within a class of IP addresses. For another example, the result can be sent to any number of Targets, which may or may not include the Sensor. The update can also vary among the Targets in accordance with the same result.

The change in responses of a Target can depend upon the computing environment. For example, if the Sensor is a server with a finite set of software authorized to execute, then the Sensor can be configured to block all unauthorized software from executing. However, if the Sensor is a personal computer or a workstation, a user is more likely to attempt execution of harmless software that is not known or authorized to execute. In order to maintain flexibility and efficiency for the user in this context, the Sensor can be configured to allow execution of certain unauthorized software.

Figure 2:
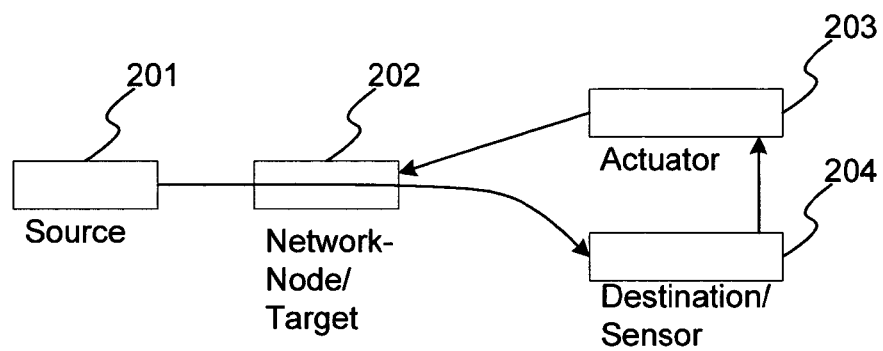
FIGS. 2 through 5 are diagrams illustrating various exemplary embodiments of a system for the classification of software in accordance with the present invention.

FIG. 2 is a diagram illustrating a first exemplary embodiment of a system for the classification of software in accordance with the present invention, comprising a Source 201, a Network-Node 202, a Sensor 204, and an Actuator 203. Here, the Sensor 204 behaves also as a Destination, and the Network-Node 202 behaves also as a Target.

Software can travel from the Source 201 through the Network-Node 202 to a Destination/Sensor 204. The Destination/Sensor 204 determines when a piece of software is attempting execution on the Destination/Sensor 204, via step 101, and classifies the piece of software as either authorized or unauthorized to execute on the Destination/Sensor 204, via step 102. If the software is classified as unauthorized to execute, the Destination/Sensor 204 sends information on the piece of software to the Actuator 203, via step 103. The information sent may comprise Source IP address and/or port and Destination IP address and/or port that constitute the channel via which the software arrived at the Destination/Sensor 204. The Actuator 203 examines the information and decides whether or not to act on the Network-Node/Target 202, via step 104. If so, then the Actuator 203 distributes a directive to the Network-Node/Target 202, via step 105. For example, the Actuator 203 may ask the Network-Node/Target 202 to restrict traffic, for example by blocking network traffic from the Source IP address and/or port to the Destination IP address and/or port, by casting a wider net such as blocking traffic from the Source IP address or a range of IP addresses regardless of port number, by blocking traffic to a port number regardless of what Source IP address it is coming from, by blocking traffic from any Source to this particular Destination, or by asking the Network-node/Target 202 to restrict traffic in any other way. The Network-Node/Target 202 then updates it responses accordingly, via step 106.

Note that in this and all other embodiments described herein, while the description generally uses a single Network-Node for brevity of explanation and conciseness of exposition, it is understood that networking may be facilitated by any number of Network-Nodes arranged in any topology or hierarchy, and accordingly that Actuators (or Managers) may choose to act on (or manage) one or more such Network-Nodes in a manner appropriate for the particular function or hierarchical position of such Network-Nodes within the set of present Network-Nodes.

Figure 3:
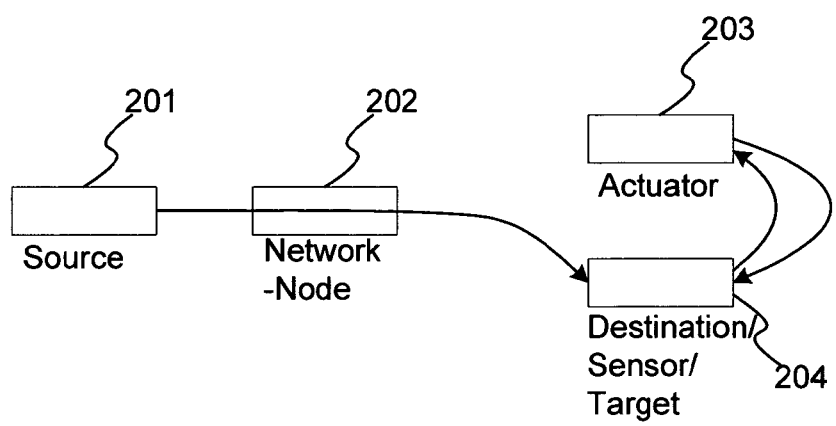

FIG. 3 is a diagram illustrating a second exemplary embodiment of the system for the classification of software in accordance with the present invention. In this embodiment, the Sensor 204 also behaves as a Destination and as a Target. Here again software can travel from the Source 201 to the Destination/Sensor/Target 204. The Destination/Sensor/Target 204 determines that software is attempting execution, via step 101, and classifies the software as either authorized or unauthorized to execute on the Destination/Sensor/Target 204, via step 102. If the software is unauthorized, the Destination/Sensor/Target 204 gathers information on the software and sends it to the Actuator 203, via step 103. The Actuator 203 examines the information and decides whether or not to act on the Destination/Sensor/Target 204, via step 104. The Actuator 203 may decide to do nothing. However, if it decides to act on the Destination/Sensor/Target 204, it sends a directive to the Destination/Sensor/Target 204, via step 105. For example, the Actuator 203 may ask the Destination/Sensor/Target 204 to block execution of this software in the future, or in the case of a solidified Destination/Sensor/Target (which would proactively block execution of such unauthorized software), may ask the Destination/Sensor/Target 204 to allow execution of this software in the future. The Destination/Sensor/Target 204 updates its responses accordingly, via step 106.

Figure 4:
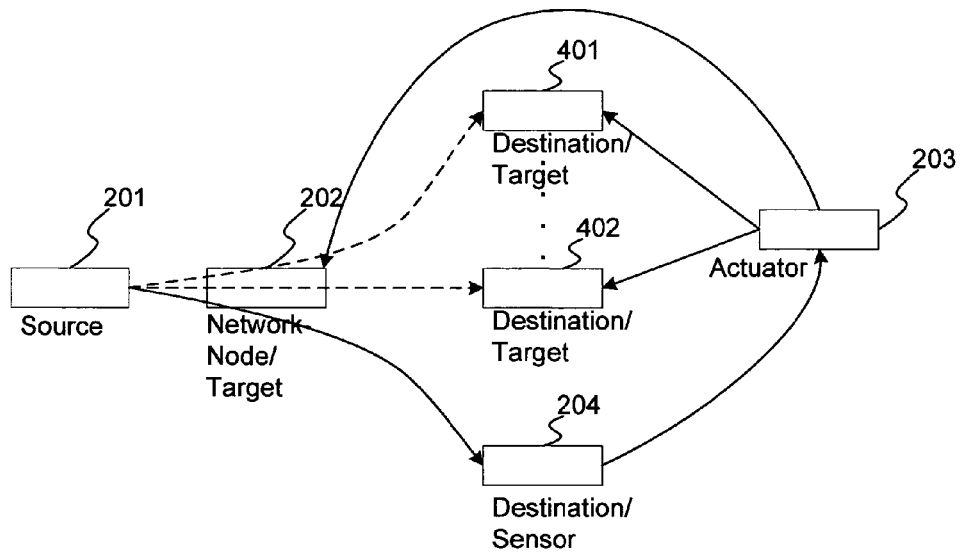

FIG. 4 illustrates a third exemplary embodiment of a system for the classification of software in accordance with the present invention. This embodiment, in addition to the components of FIG. 1, further comprises Destinations 401-402. The Network-Node 202 and the Destinations 401-402 also behave as Targets, and the Sensor 204 behaves also as a Destination.

Here again software can travel from the Source 201 to any of the Destinations 204, 401, or 402. Note that while the Destination/Sensor 204 can determine what software is attempting execution on the Destination/Sensor 204, it has no first-hand awareness of execution attempts on any other computing system and in particular on any of the other Destinations 401-402. The Destination/Sensor 204 determines when a piece of software is attempting execution on the Destination/Sensor 204, via step 101. The Destination/Sensor 204 classifies the software as either authorized or unauthorized to execute on the Destination/Sensor 204, via step 102. If the software is unauthorized, the Destination/Sensor 204 collects information on the software and sends it to the Actuator 203, via step 103. The Actuator 203 examines the information and decides whether or not to act on the Destination/Targets 401-402, via step 104. In this embodiment, the Actuator 203 can act on the Network-Node/Target 202 as described above with reference to FIG. 2, and/or on one or more of the Destination/Targets 401-402, as described above with reference to the Destination/Source/Target 204 of FIG. 3. Note that the Destination/Sensor 204 determines that the unauthorized software attempts execution on the computing system of the Destination/Sensor 204, regardless of whether a similar execution is attempted by one or more similar copies of the software on one or more of the computing systems of the Destination/Targets 401-402. Thereby, the Destination/Sensor 204 acts as a "watchdog" that notifies the Actuator 203 of unauthorized execution attempts on a representative networked computing system (in this case the Sensor's 204) among a set of computing systems (including, in this case, the Destination/Targets 401-402). The Actuator 203 can then act proactively on Destination/Targets which may or may not have experienced an attempted execution by copies of the same software, but are to be proactively protected from such executions in the future.

Figure 5:
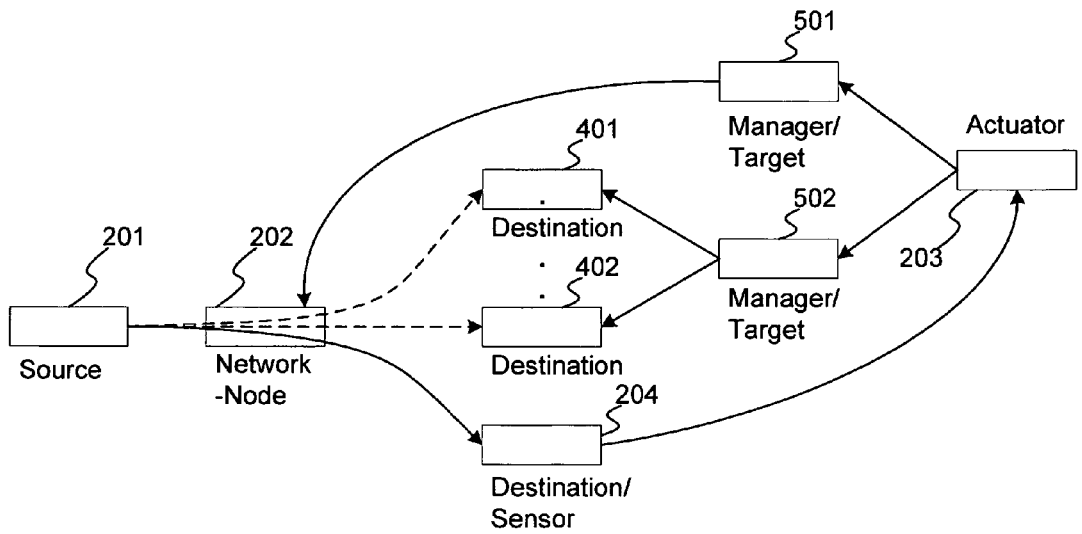

FIG. 5 is a diagram illustrating a fourth exemplary embodiment of a system for the classification of software in accordance with the present invention. This particular embodiment comprises the components illustrated in FIG. 4, except the Actuator 203 does not directly act on the Network-Node 202 or the Destinations 401-402, but instead acts through intermediary Managers 501-502 that manage the Network-Node 202 and the Destinations 401-402. Here, the Managers 501-502 also behave as Targets. One Manager 501 manages the Network-Node 202, while the other Manager 502 manages the Destinations 401-402.

Here again software can travel from the Source 201 to any of the Destinations 204, 401, or 402. The Destination/Sensor 204 determines when a piece of software is attempting execution on the Destination/Sensor 204, via step 101. The Destination/Sensor 204 classifies the software as either authorized or unauthorized to execute on the Destination/Sensor 204, via step 102. The Destination/Sensor 204 collects information on the software and sends it to the Actuator 203, via step 103. The Actuator 203 examines the information and decides whether or not to act on either of the Manager/Targets 501-502, via step 104. In this embodiment, the Actuator 203 can act on the Manager/Target 501 and cause the Manager/Target 501 to adjust the behavior of the Network-Node 202 in a manner similar to the above description of the Actuator 203 adjusting the behavior of the Network-Node 202 in FIG. 2. The Actuator 203 can also act on the Manager/Target 502 and cause the Manager/Target 502 to adjust the behavior of one or more of the Destinations 401-402 in a manner similar to the above description of the Actuator 203 adjusting the behavior of one or more of the Destination/Targets 401-402 in FIG. 4.

The embodiments in FIGS. 2-5 are exemplary only, and the described arrangements can be extended to arbitrary complexities, with any number of behaviors (Sensor, Actuator, Target, Manager, Source, Destination, Network-Node) coexisting on the same computing system and any set of interactions between the thusly behaving computing systems.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A method, comprising:
   intercepting an execution attempt by software on a computing system;
   classifying the software as authorized or unauthorized to execute on the computing system based on a set of identifiers that represents a set of software authorized to execute on the computing system;
   gathering information about the software if the software is classified as unauthorized to execute on the computing system by correlating network packets with the software, wherein the network packets are correlated with the software by a time of the execution attempt or by matching a checksum of at least a portion of the software with a checksum of a pattern in the network packets, and the information gathered through the correlating step enables one or more targets to identify or block instances of the software; and
   sending the information to one or more actuators for analysis and generation of a directive for the one or more targets.

2. The method of claim 1, wherein the identifier comprises one or more of a hash of at least a portion of a set of bits representing the software, a checksum of at least a portion of a set of bits representing the software, a message digest of at least a portion of a set of bits representing the software, an operating system file name, an operating system file system internal designator, an operating system attribute, a file system attribute, and meta-data.

3. The method of claim 1, further comprising:
   generating an identifier for the software; and
   determining if the identifier is a member of the set of identifiers,
   wherein the software is classified as unauthorized to execute on the computer system if the identifier is not a member of the set of identifiers.

4. The method of claim 1, wherein the software is classified after the software has executed on the computing system.

5. The method of claim 1, wherein the information sent to the actuators includes one or more pieces of information from the correlated network packets.

6. The method of claim 5, wherein the one or more pieces of information include one or more of: a source Internet Protocol (IP) address, a destination IP address, a source port, a destination port, a packet payload signature, and a packet header signature.

7. At least one computer readable medium comprising program instructions that when executed by a processor:
   intercept an execution attempt by software on a computing system;
   classify the software as authorized or unauthorized to execute on the computing system based on a set of identifiers that represents a set of software authorized to execute on the computing system;
   gather information about the software if the software is classified as unauthorized to execute on the computing system by correlating network packets with the software, wherein the network packets are correlated with the software by a time of the execution attempt or by matching a checksum of at least a portion of the software with a checksum of a pattern in the network packets, and the information gathered through the correlating step enables one or more targets to identify or block instances of the software; and
   send the information to one or more actuators for analysis and generation of a directive for the one or more targets.

8. The at least one computer readable medium of claim 7, comprising further program instructions that when executed by a processor:
   generate an identifier for the software; and
   determine if the identifier is a member of the set of identifiers,
   wherein the software is classified as unauthorized to execute on the computer system if the identifier is not a member of the set of identifiers.

9. The at least one computer readable medium of claim 7, wherein the information sent to the actuators includes one or more pieces of information from the correlated network packets.

10. The at least one computer readable medium of claim 9, wherein the one or more pieces of information include one or more of: a source Internet Protocol (IP) address, a destination IP address, a source port, a destination port, a packet payload signature, and a packet header signature.

11. An apparatus, comprising:
a computing system;
at least one sensor coupled to the computing system, the sensor configured to:
intercept an execution attempt by software on the computing system;
classify the software as authorized or unauthorized to execute on the computing system based on a set of identifiers that represents a set of software authorized to execute on the computing system;
gather information about the software if the software is classified as unauthorized to execute on the computing system by correlating network packets with the software, wherein the network packets are correlated with the software by a time of the execution attempt or by matching a checksum of at least a portion of the software with a checksum of a pattern in the network packets, and the information gathered through the correlating step enables one or more targets to identify or block instances of the software; and
send the information to one or more actuators for analysis and generation of a directive for the one or more targets.

12. The apparatus of claim 11, wherein the identifier comprises one or more of a hash of at least a portion of a set of bits representing the software, a checksum of at least a portion of a set of bits representing the software, a message digest of at least a portion of a set of bits representing the software, an operating system file name, an operating system file system internal designator, an operating system attribute, a file system attribute, and meta-data.

13. The apparatus of claim 11, wherein the sensor is further configured to:
generate an identifier for the software; and
determine if the identifier is a member of the set of identifiers,
wherein the software is classified as unauthorized to execute on the computer system if the identifier is not a member of the set of identifiers.

14. The apparatus of claim 11, wherein the information sent to the actuators includes one or more pieces of information from the correlated network packets.

* * * * *

UNITED STATES PATENT AND TRADEMARK OFFICE
CERTIFICATE OF CORRECTION

PATENT NO. : 8,763,118 B2  
APPLICATION NO. : 13/629765  
DATED : June 24, 2014  
INVENTOR(S) : E. John Sebes et al.

Page 1 of 1

It is certified that error appears in the above-identified patent and that said Letters Patent is hereby corrected as shown below:

On the Title Page

On Page 4, Item (56) under "OTHER PUBLICATIONS", in column 1, line 18-22, Below "Venkata Ramanan, et al." delete "An Analysis of Address Space Layout Randomization on Windows Vista.TM., Symantec Advanced Threat Research, copyright 2007 Symantec Corporation, available at http://www.symantec.com/avcenter/reference/Address_Space_Layout_Randomization.pdf, 19 pages."

Signed and Sealed this
Sixteenth Day of September, 2014

Michelle K. Lee
*Deputy Director of the United States Patent and Trademark Office*